Patented Feb. 20, 1934

1,947,464

UNITED STATES PATENT OFFICE 1,947,464

MANUFACTURE OF ORGANIC SUBSTITUTION DERIVATIVES OF CELLULOSE

Henry Dreyfus, London, England

No Drawing. Application October 30, 1930, Serial No. 492,362, and in Great Britain November 28, 1929

8 Claims. (Cl. 260—152)

This invention relates to the manufacture of new cellulose derivatives and in particular to the manufacture of new nitrogen-containing aralkyl ethers of cellulose.

In my prior U. S. Patent No. 1,451,330 I have described the manufacture of aralkyl ethers of cellulose by substituting one or more of the hydroxy groups of cellulose by aralkyl groups, as for example by treating cellulose or cellulose-containing materials in the presence of alkali with benzyl chloride or its homologues, for example chlor ethyl benzenes or ω-chlor xylenes.

According to the present invention new cellulose derivatives are produced by substituting some or all of the hydroxy groups of cellulose by means of amino aralkyl groups.

For the purpose of introducing the amino aralkyl groups I prefer to treat the cellulose or cellulose-containing material directly in the presence of alkali with amino aralkylating agents. As an alternative, however, the cellulose or cellulose-containing material may be preliminarily treated with nitro aralkylating agents and the products so obtained reduced to the corresponding amino aralkyl ethers of cellulose. The intermediate nitro aralkyl ethers are themselves new products and their production is included within the scope of the present invention.

As examples of suitable amino aralkylating agents for use according to the present invention the following may be instanced:—2-chlormethyl-benzylamine, ortho-γ-chlorpropyl aniline, ortho-β-chlorpropyl aniline, 3-acetamino-benzyl chloride and 4-acetamino-benzyl chloride, while in the case of forming nitro aralkyl ethers as intermediate products I may use as the aralkylating agent ortho, meta, or para-nitro-benzyl chloride, 2.4 - dinitro - benzyl-chloride, para-nitrophenyl-ethyl chloride, 2-nitro-1.4-dichlormethyl-benzene.

The invention contemplates the production of cellulose derivatives containing any desired proportion of the new aralkyl ether groups. For example the proportion may be under one ether group to one molecule of cellulose calculated on the $C_6$ formula, or higher quantities may be produced containing up to two or even three such aralkyl groups. The invention further contemplates the production of mixed derivatives containing the new aralkyl ether groups in conjunction with other substituent groups for cellulose, for example other aralkyl groups or alkyl groups, such mixed derivatives being produced by treatment with the different substituting agents in either order or together.

As initial materials for use according to the present invention any desired cellulosic materials may be used, for example cotton cellulose or its near conversion products, e. g. the regenerated cellulosic type of viscose, wood pulps, and preferably chemical wood pulps, such as sulphite pulp, soda pulp and sulphate pulp from which the lignin, pentosan resin and like constituents have been substantially removed. Furthermore, as already indicated, the invention contemplates the treatment of suitable cellulose derivatives containing free hydroxy groups, e. g. methyl, ethyl or other alkyl, or aralkyl, hydroxy or carboxyalkyl derivatives of cellulose.

The actual etherification may be conducted on the lines described in my prior U. S. Patent No. 1,451,330, that is to say the etherification is preferably effected in presence of relatively limited amounts of water and in presence of alkali sufficient to form relatively concentrated solutions in any water which may be present. The invention is however not limited to any specific proportions in these respects, and the following indications are merely given to show the best methods of obtaining the new cellulose derivatives. The water present is preferably less than 4 times the weight of the cellulose and may be as low as 1½ or ½ times its weight or less, or may be wholly or partly replaced by organic liquids, such as ether, alcohol, benzene, toluene or the like. Caustic alkali, on the other hand, is preferably present in at least sufficient quantity to form a saturated solution with the water present, and may be present in a proportion greater than 3 times the weight of the water up to 19 times its weight or more. As described in my U. S. Patent No. 1,542,541, the etherification may be conducted in presence of substances adapted to bind water by chemical reaction, e. g. lime. Catalysts, for example copper powder, copper salts or hydroxides, may be present during the etherification. To obtain a high content of the new aralkyl groups the aralkylation may be effected in two or more stages, either the alkali or the etherifying agent or both being added in stages. The whole reaction may, if desired, be effected in presence of a relatively large quantity of inert diluent, e. g. ether, benzene or toluene, and such diluents may be, and preferably are, solvents for the aralkylating agents used.

As previously indicated the invention also includes the reduction of nitro-aralkyl ethers of cellulose to the corresponding amino-aralkyl celluloses. The reduction may be effected in any suitable manner, for example by treating the ether in solution or suspension in glacial acetic acid with iron powder or other metals, or by treating the ether with aqueous hydrosulphites or aqueous alcoholic hydrosulphites or with any other agents capable of reducing the nitro derivatives.

Any of the new cellulose derivatives which contain primary or secondary amino groups may be alkylated, aralkylated, arylated or acylated to produce still further derivatives. Furthermore where the new cellulose derivatives contain hydroxy groups either in the substituents or attached to the cellulose molecule such hydroxy groups may be alkylated, aralkylated or acylated. In the case of treating cellulose derivatives which contain both primary or secondary amino groups and free hydroxy groups the alkylation, aralkylation or acylation of the two types of group may take place simultaneously.

The new cellulose derivatives, and particularly those containing amino or substituted amino groups, possess an affinity for acid dyestuffs and accordingly they may be advantageously used for textile purposes either alone or in admixture or association with other cellulose derivatives.

The following examples show the best methods known to me for carrying the invention into effect, but they are not to be considered as limiting it in any way:—

Example 1

162 parts of cellulose, for example cotton or purified wood pulp, are treated with 320 parts of a 50% caustic soda solution and the whole kneaded for about 2 hours in a kneading machine. There are then added 300 to 400 parts of 2-chlor-methyl-benzylamine, the addition being made gradually and the whole being maintained at a temperature of about 50 to 75° C. After about 4 hours a further 160 parts of powdered caustic soda are worked into the mass together with 450 parts of the amino aralkylating agent. After this addition the temperature may be allowed to rise somewhat, for example up to 100° C. If desired the product may be subjected to a further etherifying step with the amino aralkylating agent.

The product is soluble in acetic acid and may be formed into filaments, threads, ribbons or like products from solution. It has an affinity for acid wool dyestuffs. By alkylation, arylation, aralkylation or acylation of the free amino groups further new cellulose derivatives may be produced also having affinity for acid wool dyestuffs. The alkylation, arylation, aralkylation or acylation may be effected according to known methods.

Instead of impregnating the cellulosic material with concentrated caustic soda lye it may be first impregnated with water or with dilute caustic soda lye and powdered caustic soda then worked in.

Example 2

The reaction is carried out as described in Example 1 but using equivalent proportions of 3-acetamino benzyl chloride instead of the 2-chlor-methyl-benzylamine. The product has similar properties and is soluble in acetic acid.

Example 3

Cotton yarn is mercerized by means of caustic soda lye of 20 to 25% concentration. The excess lye is separated from the yarn which is then introduced into an acetic acid solution containing 50% on the weight of the goods of 3-acetamino benzyl chloride. The whole is maintained for 2 to 3 hours at a temperature of 40 to 60° C., the yarn being kept in constant movement. At the end of the reaction the cotton is removed from the liquor, pressed and washed. It has an affinity for acid dyestuffs.

Example 4

162 parts of cellulose, for example cotton or purified wood pulp, are treated with 320 parts of a 50% caustic soda solution and the whole kneaded for about 2 hours in a kneading machine. There are then added 350 to 450 parts of para-nitro-benzyl chloride, the addition being made gradually and the whole being maintained at a temperature of about 50 to 75° C. After about 4 hours a further 160 parts of powdered caustic soda are worked into the mass together with 500 parts of the nitro aralkylating agent. After this addition the temperature may be allowed to rise somewhat, for example up to 100° C. If desired the product may be subjected to a further etherifying step with the nitro aralkylating agent.

The product para-nitro-benzyl cellulose is soluble in acetic acid and may be reduced to the corresponding amino body, para-amino benzyl cellulose, by treatment in solution or suspension with reducing agents. The amino aralkyl ether as before may be further substituted by treatment with alkylating, arylating, aralkylating or acylating agents.

What I claim and desire to secure by Letters Patent is:—

1. Process for the manufacture of new cellulose derivatives, comprising treating cellulose with amino aralkylating agents in the presence of alkali.
2. Process for the manufacture of new cellulose derivatives, comprising treating cellulose with amino aralkylating agents in the presence of caustic alkali.
3. Process for the manufacture of new cellulose derivatives which comprises treating cellulose with 2-(chlor-methyl)-benzylamine in the presence of caustic alkali.
4. Process for the manufacture of new cellulose derivatives which comprises treating cellulose with 3-acetamino benzyl chloride in the presence of caustic alkali.
5. Process for the manufacture of new cellulose derivatives, comprising treating cellulose with amino aralkylating agents in the presence of caustic alkali in sufficient quantity to form a concentrated solution with any water present.
6. Amino aralkyl ethers of cellulose.
7. O-(amino-methyl)-benzyl cellulose.
8. M-acetamino-benzyl cellulose.

HENRY DREYFUS.

CERTIFICATE OF CORRECTION.

Patent No. 1,947,464. February 20, 1934.

HENRY DREYFUS.

It is hereby certified that error appears in the printed specification of the above numbered patent requiring correction as follows: Page 1, line 68, after "hydroxy" insert the word alkyl; and that the said Letters Patent should be read with this correction therein that the same may conform to the record of the case in the Patent Office.

Signed and sealed this 15th day of May, A. D. 1934.

Bryan M. Battey (Seal) Acting Commissioner of Patents.